Patented Aug. 10, 1926.

1,595,897

UNITED STATES PATENT OFFICE.

HERMAN LEWIS, OF NEW YORK, N. Y.

CEMENT COMPOSITION.

No Drawing. Application filed April 7, 1925. Serial No. 21,436.

This invention relates to a decorative composition and more particularly to a cement of pasty consistency adapted for application to any wallboard, or rough mortar brown coat, cement, concrete, plaster, or brick walls, or painted walls, wallpaper, muslin, canvas, and the like without previous preparation of the surface to be coated. The composition is likewise applicable to metals, tiles, glass, and wood surfaces.

It is an object of this invention to provide a composition cement which can be applied directly to a surface to be coated without the previous preparation of such surface to receive the composition.

A further object is to provide a fireproof coating composition which will not peel, crack, or chip, and which sets and dries quickly.

Other and further objects will be apparent from the following description:

The composition comprising the present invention consists of a group of "dry" materials, forming the body of the composition, to which a group of "wet" materials are separately added, preferably in the order hereinafter set forth, to insure proper flexibility, drying, and hardening properties in the applied coating.

For convenience of description the following formula is given which, when followed, gives approximately fifty gallons of the finished composition in paste form. It is understood, however, that the quantities of the various ingredient substances can be varied for different requirements, but good results can only be obtained where the same relative proportions of the ingredients are used. An illustrative formula is given as follows:

*Dry materials.*

25 pounds of pulverized silex.
25 pounds of silica, number seventy-two mesh.
125 pounds of grade number ten washed and bleached sand.
50 pounds of white Portland cement.
25 pounds of dry white lead.
25 pounds of dry lithopone.
50 pounds of asbestos fiber.

The above ingredients are thoroughly mixed, and the following "wet" materials are added thereto separately:—

*Wet materials.*

10 pounds of medium cup grease.
7½ gals. of turpentine.
7½ gals. of water oil (kerosene).
5 gals. of raw linseed oil.
2½ gals. of boiled linseed oil.
2½ gals. of white japan drier.

To the above mixture of wet and dry materials is added a slaked lime mixture in the proportions of seventy-five (75) pounds of lime to six (6) gallons of water which is mixed therewith, such mixing continuing until the resulting composition has attained the consistency of a fluffy paste.

The composition made according to the above formula, or having the same relative proportions of ingredients, can be applied by brush, trowel, or sponge to the surface to be coated. The coating of the composition so applied is then stippled with a brush or sponge, after which colored sands are blown into the composition while the material is still soft, and subsequently it is brushed over with a palet knife or trowel to smooth the surface as desired. The composition can also be moulded into blocks resembling stone, and can be made to give the unique effect of caen stone, trevotine, or unpolished marble, or any desired sand or grain effect.

From the foregoing it will be apparent that I have invented a decorative composition which is adaptable to a wide variety of uses, which is easily prepared and applied, and which dries quickly after such application, leaving a hard, permanent surface which adheres with great tenacity to the object to which it is applied without necessitating any previous preparation of the object to receive the coating.

Having described my invention, what I claim is:—

1. A cement composition consisting of silica, Portland cement, white lead, lithopone, and fibrous asbestos to which is added cup grease, linseed oil, japan drier, turpentine and kerosene, in such proportion as to possess marked cementive, fire resistant, decorative and desirable drying and setting characteristics, the mixture being agitated with slaked lime to the consistency of a fluffy paste.

2. A cement composition consisting of silex, silica, sand, Portland cement, dry white lead, lithopone, asbestos fiber and cup grease, mixed with linseed oil, japan drier, turpentine, kerosene, and slaked lime, having the generic characteristics of a specific mixture of the same ingredients in the following proportions by weight, silex one part, silica one part, sand five parts, Portland cement two parts, dry white lead one part, lithopone one part, asbestos fiber two parts, cup grease two-fifths of one part, slaked lime three parts, and by volume, turpentine three parts, kerosene three parts, raw linseed oil two parts, boiled linseed oil one part, japan drier one part, and water between two and three parts.

3. A cement composition consisting of the following ingredients in any quantity, but in the same relative proportions thereof:— twenty-five pounds of silex; twenty-five pounds of silica; one hundred and twenty-five pounds of sand; fifty pounds of Portland cement; twenty-five pounds of white lead; twenty-five pounds of lithopone; fifty pounds of asbestos fiber; ten pounds of cup grease; seven and one-half gallons of turpentine; seven and one-half gallons of kerosene; five gallons of raw linseed oil; two and one-half gallons of boiled linseed oil; two and one-half gallons of japan drier; seventy-five pounds of lime; and six gallons of water.

In testimony whereof I have hereunto set my hand.

HERMAN LEWIS.